Sept. 4, 1962 G. RATTI 3,052,160
SPECTACLE FRAME WITH FLEXIBLE PORTIONS
Filed Jan. 20, 1960 3 Sheets-Sheet 1
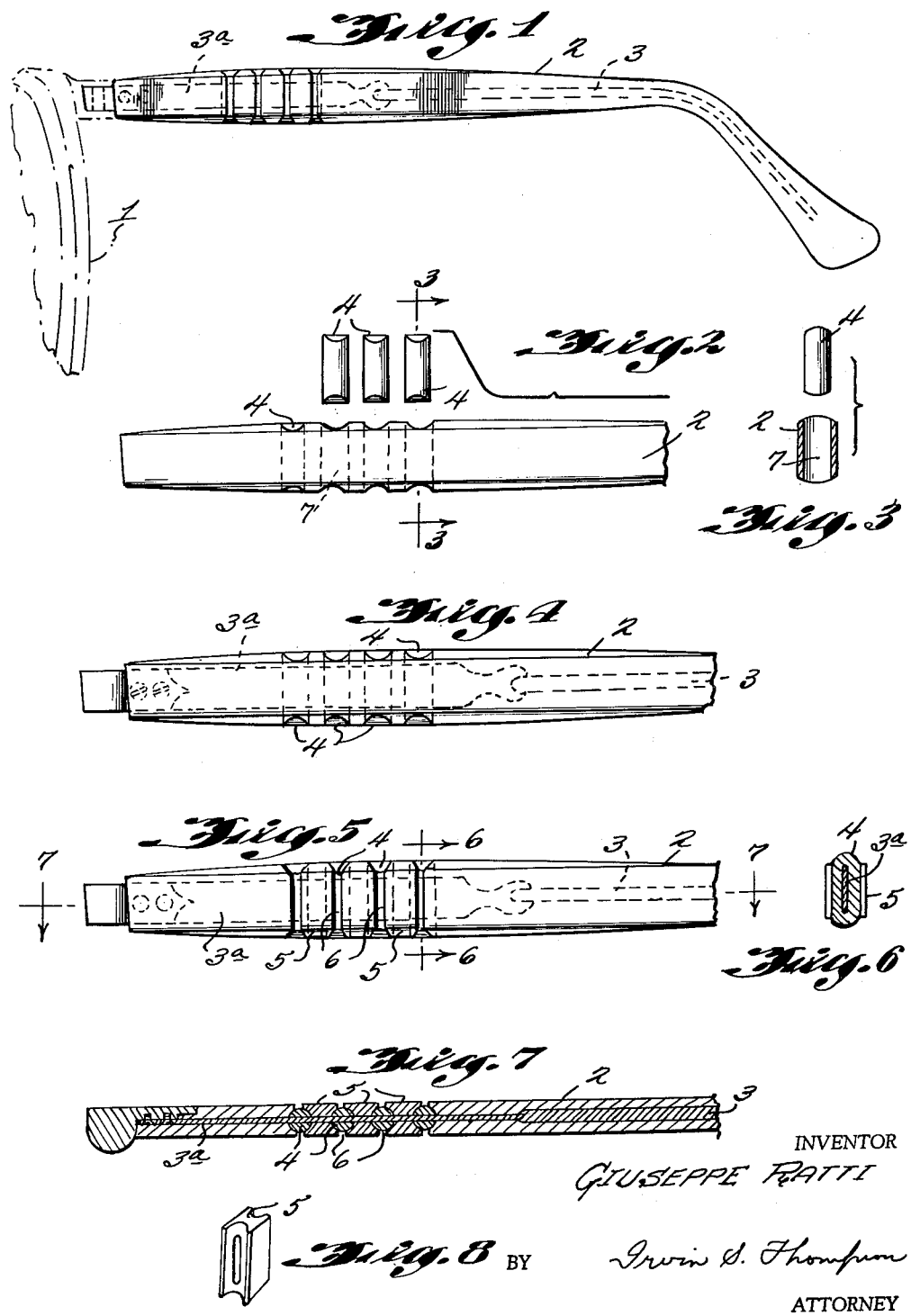
INVENTOR
GIUSEPPE RATTI
BY Irwin S. Thompson
ATTORNEY INVENTOR
GIUSEPPE RATTI
BY Irwin S. Thompson
ATTORNEY

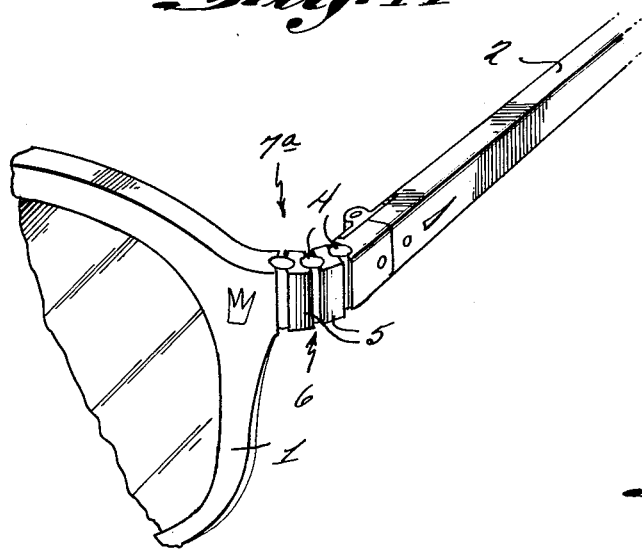
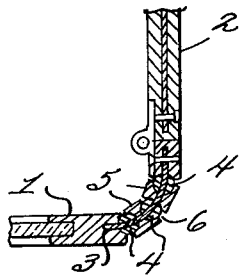
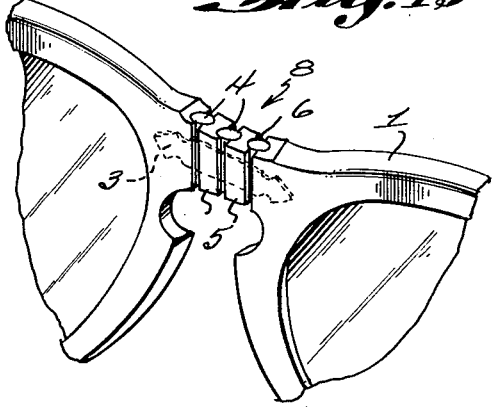
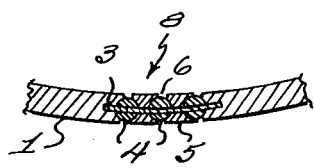

United States Patent Office 3,052,160
Patented Sept. 4, 1962

3,052,160
SPECTACLE FRAME WITH FLEXIBLE PORTIONS
Giuseppe Ratti, Turin, Italy, assignor to S.p.A. Giuseppe
Ratti Industria Italiana Occhiali, Turin, Italy
Filed Jan. 20, 1960, Ser. No. 3,586
Claims priority, application Italy Jan. 26, 1959
6 Claims. (Cl. 88—52)

This invention relates to spectacle frames, e.g. made of Celluloid, synthetic resins, metal or like comparatively rigid materials. The invention concerns in particular a spectacle frame, some portions of which—for instance its side members, the bridge or other parts—are rendered laterally flexible in order to adapt the spectacle frame to the face of the wearer and to avoid, inter alia, any undesirable pressure as in the case of the conventional rigid sides.

It has already been proposed to attain this lateral flexibility by forming for instance a number of slots in the side member or bar of rigid material mentioned above, provided with a flattened metallic core flexible in a lateral direction, for instance of steel, so that the bar will comprise—in the portion considered—a plurality of small blocks or segments arranged side by side.

This solution, although imparting a certain degree of lateral flexibility to the side member or bar, is not exempt from disadvantages. Cutting of the slots is a delicate operation, which requires a most accurate adjustment of the depth of cut, in order to avoid any damage to the flexible metal core or to prevent an incomplete cut layer from remaining on the bar, thereby impairing the flexibility thereof in that area. Further, impurities and perspiration can enter into the slots formed in the bar and reach the metal core, with consequent risk of rusting and weakening of said core. For this reason, the slots must be extremely thin. On the other hand, the thinness of the slots obviously limits the flexibility of the bar. Finally, it should be noted that the small blocks or segments comprising the flexible length of the bar are simply arranged side by side with flat surfaces facing one another. When the bar is deflected, said blocks or segments come into contact with one another on one of their outer edges, whereas they are pulled apart from one another on the opposite edge.

The present invention solves this problem in a basically different manner, by creating in the portion which is intended to be rendered flexible (bar, bridge or other member) a chain of elements mutually articulated along cylindrical surfaces and held together by a flexible inner core, which remains fully protected outwardly, there being no slot or cut which directly reaches said core. In particular, the elements of this chain may comprise, alternately, small cylindrical bodies with small blocks interposed between them, whose faces directed towards the small cylinders are concave in shape and have a cylindrical surface corresponding to that of the small cylinder with which they are coupled. It is therefore apparent that the various components of this chain are mutually articulated with their cylindrical surfaces and, when the bar, the bridge or other portion of the spectacle frame is deflected, they will slide over one another while remaining always coupled with said surfaces.

Various embodiments of a spectacle frame provided with portions which are rendered flexible in accordance with this invention are shown by way of example in the accompanying drawings, wherein:

FIG. 1 is a side view of a side member or bar of the spectacle frame rendered flexible according to the invention;

FIG. 2 shows, on a larger scale, a portion of the frame with holes formed therein and the cylindrical bodies which will be inserted into said holes;

FIG. 3 is a section along line 3—3 of FIG. 2;

FIG. 4 shows the same portion of the side member with the small cylindrical blocks inserted and further showing the inner core;

FIG. 5 shows the side member after cutting of the side slots;

FIG. 6 is a section along line 6—6 of FIG. 5;

FIG. 7 is a section along line 7—7 of FIG. 5;

FIG. 8 shows an element of the articulated chain;

Figure 9:
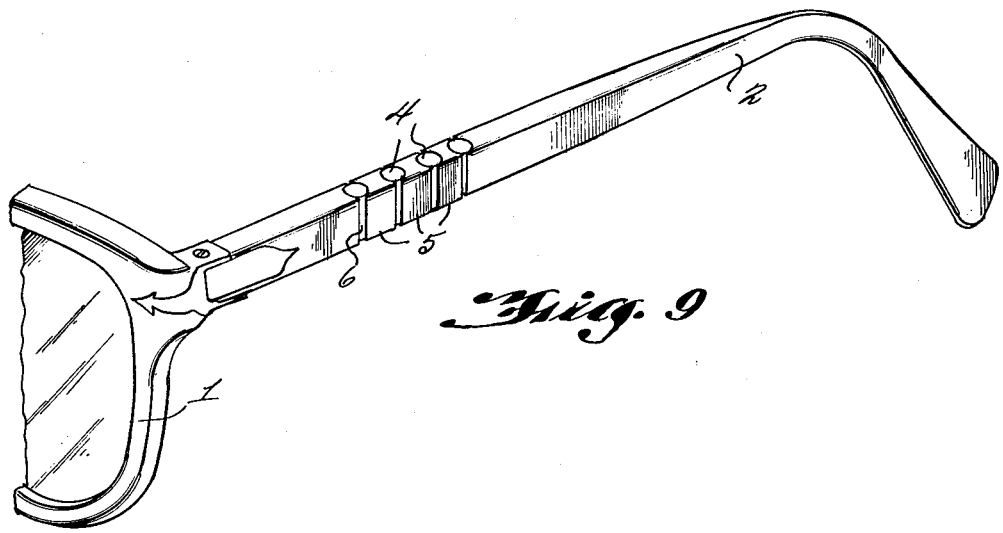
FIGS. 9 and 10 are partial perspective views of the spectacle frame, showing the bar in the straight and deflected condition, respectively.

FIGS. 11 and 12 show, in perspective view and in section respectively, another embodiment of the invention given by way of example, wherein the frame front is provided with two extensions serving for the hinged connection of the bars and which are rendered flexible by the system according to the invention, and FIGS. 13 and 14 show, also in perspective view and in section respectively, the application of the invention to the front bridge of the spectacle frame.

As is apparent from the drawing, the spectacle frame of a comparatively rigid material, comprises the front part 1 and the side members or bars 2 (only one of which is shown in the figures), provided with a metal core 3. A portion 3a of said core, placed in the region of the bar which is to be rendered flexible, is formed for instance in known manner by a thin steel plate which is flexible in a lateral direction.

According to the invention, in order to obtain the desired lateral flexibility of a portion of the bar, so that it may adapt itself to the face of the wearer, said portion is formed—as shown in particular in FIGS. 1, 7 and 9—by a chain of separate elements, mutually articulated along cylindrical surfaces. In particular, in the embodiment considered, said elements comprise cylindrical bodies 4 with small blocks 5 interposed therebetween, whose faces directed towards the small cylinders 4 are formed with a corresponding recess which accommodates part of the small cylinder 4. The depth of said recess is such that, when the chain is assembled, the edges of the small blocks 5 will be separated from one another by a spacing 6. The elements 4, 5 of said chain are passed through by the flexible metal core 3a. It is apparent that the elements described may deviate angularly relative to one another while remaining always mutually coupled along their cylindrical surfaces, thus permitting deflection of the bar.

A particularly advantageous and simple method for manufacturing the bar or side member is illustrated merely by way of example in FIGS. 2 to 7. The first step of the operation consists in forming in the bar or side member 2, not yet provided with the metal core, a plurality of holes 7 (FIG. 2), into which the cylindrical elements 4 will be subsequently inserted, possibly already provided with slots for passage of the metal core 3a. Thereafter, the metal core 3—3a is introduced into the bar 2 containing the small cylinders 4, by methods known per se.

Finally, in order to obtain separation of the small blocks 5, provision is made for cutting—in correspondence with the diameter of each cylinder 4 transverse to the bar—a number of slots on the outer and inner sides of said bar, so as to create a plurality of spacings 6 between the small blocks 5.

Said slots may have any width as deemed suitable.

The chain of articulated elements 4, 5, which is obtained in the manner just described, provides a very good flexibility of the bar in the chosen portion, with the further advantage that the metal core will remain always fully protected outwardly and the elements will be permanently coupled with one another on their cooperating cylindrical surfaces.

In the embodiment shown in FIGS. 11 and 12, the front 1 of the spectacle frame is provided, at each side thereof, with an extension 1a for the hinged connection of the bars 2. In order to render flexible this extension it is formed, as in the case described above, by a chain of separate elements articulated to one another along cylindrical surfaces and held together by a curved and flexible inner metal core. In particular, said elements comprise cylindrical bodies 4 having interposed between them a number of small blocks 5, whose faces directed towards the cylinders 4 are formed with a corresponding cylindrical recess which accommodates part of the small cylinder 4.

The depth of said recess is such that in the assembled chain the edges of the small blocks are separated from one another by a spacing 6. The elements 4, 5 of the chain are passed through by the flexible metal core 3. It is apparent that the elements described can deviate mutually in angular directions while always remaining coupled with one another along their cylindrical surfaces and therefore permitting deflection of the extension 1a.

Figure 10:
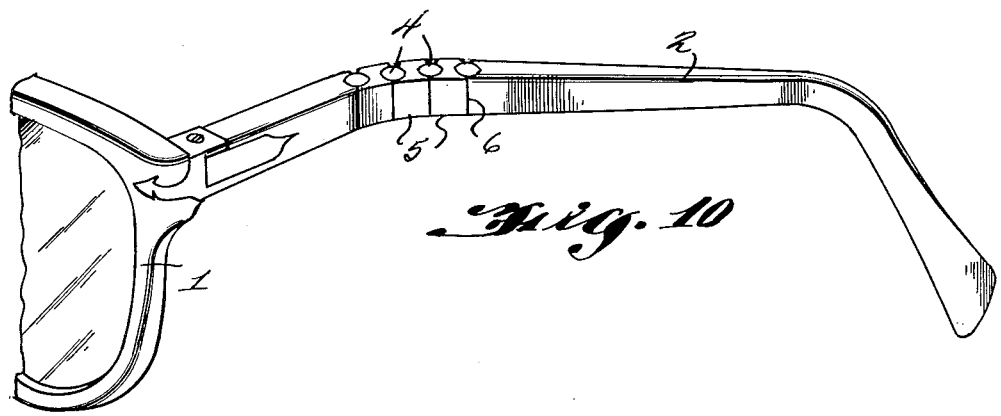

It is understood that to the frame front described above, provided with the two flexible extensions 2, there may be applied either two flexible bars as shown in FIGS. 9 and 10, or two rigid bars or side members, inasmuch as the flexibility required for adaptation of the frame has been already realized by means of said extensions.

FIGS. 13 and 14 show the application of the principle of the invention to the frame bridge.

In this instance, the bridge 8 of the front part 1 comprises a chain of separate elements articulated to one another along cylindrical surfaces, in particular a chain of small cylinders and blocks, 4 and 5 respectively, similar to those of the preceding examples, which are held together by a flexible metal core 3. Therefore, also in this case the required flexibility of the bridge 8 will be obtained.

It will be understood that the details described above may vary from those set forth and illustrated above merely by way of example, without departing from the scope of the invention. Thus, for instance, the holes and slots formed in the bar, in the bridge or other part of the frame, instead of being perpendicular to the longitudinal dimension of the part concerned, may also be sloping. The number of the elements coupled in the chain may of course vary. In the examples shown, it has been assumed that the elements 4, 5 be of the same material of which the frame is made, but it is obvious that they may also be of different material. For instance, the elements 4 or the elements 5, or also both these types of elements, may also be made of metal, while the remainder of the frame is of synthetic material.

The elements coupled in the chain may also have different colours, whereby various ornamental effects can be obtained. It is of course not indispensable that the elements 4 be in form of cylinders, but they may also have other shapes, provided that they have cylindrical end surfaces adapted to co-operate with the corresponding recesses of the small blocks 5.

As it will be apparent to those skilled in the art, the invention can be also applied to metallic and combined spectacle frames.

What I claim is:

1. A spectacle frame of relatively rigid material comprising a front part and side members hinged thereto, and having one or more flexible portions formed by a chain having elements mutually articulated along cylindrical surfaces and held together by a flexible inner core passing through said chain, said elements comprising, alternately, small cylindrical bodies and small blocks interposed therebetween, whose faces directed towards the cylindrical bodies are concave in shape and have a cylindrical surface which accommodates part of the adjacent cylindrical body, the part of the frame to be rendered flexible being formed with suitably spaced through holes, in which said cylindrical bodies are inserted, the inner and outer sides of said part, after the insertion of said flexible inner core, being cut with slots in line with the diameter of the cylindrical bodies which is transverse to said part.

2. A spectacle frame of relatively rigid material comprising a front part and side members hinged thereto, and having one or more flexible portions formed by a chain having elements mutually articulated along cylindrical surfaces and held together by a flexible inner core passing through said chain, said elements comprising, alternately, small cylindrical bodies and small blocks interposed therebetween, whose faces directed towards the cylindrical bodies are concave in shape and have a cylindrical surface which accommodates part of the adjacent cylindrical body.

3. A spectacle frame of relatively rigid material comprising a front part and side members hinged thereto, and having one or more flexible portions formed by a chain having elements mutually articulated along cylindrical surfaces and held together by a flexible inner core passing through said chain, said elements comprising, alternately, small cylindrical bodies and small blocks interposed therebetween, whose faces directed towards the cylindrical bodies are concave in shape and have a cylindrical surface which accommodates part of the adjacent cylindrical body, the depth of said cylindrical recesses being such that, when the chain of elements is assembled, the edges of said blocks are spaced from one another.

4. A spectacle frame as defined in claim 3, wherein the flexible portions are formed in the side members of the frame.

5. A spectacle frame as defined in claim 3, wherein the flexible portion is formed in the bridge of the front part of the frame.

6. A spectacle frame as defined in claim 3, wherein the front of the frame comprises two extensions to which the bars are hinged and wherein the flexible portions are formed in said extensions.

References Cited in the file of this patent

UNITED STATES PATENTS

| | | |
|---|---|---|
| 1,265,511 | Poeton | May 7, 1918 |
| 1,419,005 | Barnes | June 6, 1922 |

FOREIGN PATENTS

| | | |
|---|---|---|
| 252,857 | Switzerland | Oct. 16, 1948 |
| 278,996 | Switzerland | Feb. 16, 1952 |
| 964,965 | France | Feb. 8, 1950 |